(12) United States Patent
Feigel et al.

(10) Patent No.: US 9,868,426 B2
(45) Date of Patent: Jan. 16, 2018

(54) PRESSURE PROVISION DEVICE AND BRAKE SYSTEM

(71) Applicant: Continental Teves AG & Co. oHG, Frankfurt (DE)

(72) Inventors: Hans-Jörg Feigel, Rosbach (DE); Peter Drott, Frankfurt/Main (DE); Kristijan Tarandek, Neu-Isenburg (DE); Johann Jungbecker, Badenheim (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 14 days.

(21) Appl. No.: 14/772,658

(22) PCT Filed: Feb. 28, 2014

(86) PCT No.: PCT/EP2014/053965
§ 371 (c)(1),
(2) Date: Sep. 3, 2015

(87) PCT Pub. No.: WO2014/135454
PCT Pub. Date: Sep. 12, 2014

(65) Prior Publication Data
US 2016/0031426 A1 Feb. 4, 2016

(30) Foreign Application Priority Data

Mar. 5, 2013 (DE) .......... 10 2013 203 733
Aug. 20, 2013 (DE) .......... 10 2013 216 423

(51) Int. Cl.
*B60T 8/42* (2006.01)
*B60T 11/224* (2006.01)
(Continued)

(52) U.S. Cl.
CPC .......... *B60T 11/224* (2013.01); *B60T 8/4018* (2013.01); *B60T 8/4081* (2013.01); *B60T 13/66* (2013.01);
(Continued)

(58) Field of Classification Search
CPC .... B60T 13/745; B60T 8/4081; B60T 13/662; B60T 13/686; B60T 8/326; B60T 8/3655;
(Continued)

(56) References Cited

U.S. PATENT DOCUMENTS 5,015,040 A * 5/1991 Lin ............... B60T 8/1764
188/181 C
5,273,348 A * 12/1993 Yagi ............... B60T 8/24
303/117.1

(Continued)

FOREIGN PATENT DOCUMENTS

CN 102056781 A 5/2011
DE 3816110 A1 11/1989
(Continued)

OTHER PUBLICATIONS

PCT International Search Report—dated Sep. 24, 2014.
German Examination Report—dated Feb. 18, 2014.

*Primary Examiner* — Anna Momper
*Assistant Examiner* — Mahbubur Rashid
(74) *Attorney, Agent, or Firm* — Brinks Gilson & Lione

(57) ABSTRACT

The invention relates to an electrically controllable pressure provision device (5, 5'), particularly for a hydraulic motor-vehicle brake system, comprising a stepped bore (54), which is arranged in a housing (53,21), and a piston (51), which can be actuated by an electromechanical actuator (35, 36). The piston (51), together with the housing (53, 21), delimits a pressure chamber (50). The piston (51) is constructed as a stepped piston, the smaller-diameter piston step (51') of
(Continued)

which enters the smaller-diameter step (54') of the stepped bore after a specified actuation of the stepped piston, such that the pressure chamber (50) is subdivided into a first pressure chamber (55) and a second pressure chamber (56). The invention further relates to a brake system for motor vehicles having such a pressure provision device.

23 Claims, 2 Drawing Sheets

(51) Int. Cl.
*B60T 13/66* (2006.01)
*B60T 13/68* (2006.01)
*B60T 13/74* (2006.01)
*B60T 8/40* (2006.01)

(52) U.S. Cl.
CPC .......... *B60T 13/662* (2013.01); *B60T 13/686* (2013.01); *B60T 13/745* (2013.01)

(58) Field of Classification Search
CPC ...... B60T 8/4266; B60T 11/224; B60T 13/57; B60T 13/66; B60T 13/68

USPC ...................................................... 303/115.2
See application file for complete search history.

(56) References Cited

U.S. PATENT DOCUMENTS

| | | | |
|---|---|---|---|
| 5,713,640 A | * | 2/1998 | Feigel ................... B60T 8/3265 |
| | | | 303/115.2 |
| 2010/0259096 A1 | * | 10/2010 | Rieth .................... B60T 8/4081 |
| | | | 303/116.1 |
| 2011/0120122 A1 | | 5/2011 | Cagnac et al. |

FOREIGN PATENT DOCUMENTS

| | | |
|---|---|---|
| DE | 44 01 524 A1 | 8/1995 |
| DE | 102 55 198 A1 | 7/2003 |
| DE | 10 2009 031 672 A1 | 1/2011 |
| DE | 10 2011 006 310 A1 | 12/2012 |
| EP | WO 2011/029812 A1 | 3/2011 |
| GB | 2 172 353 A1 | 9/1986 |

* cited by examiner

PRESSURE PROVISION DEVICE AND BRAKE SYSTEM

CROSS REFERENCE TO RELATED APPLICATIONS

This application claims priority to German Patent Application Nos. 10 2013 203 733.3, filed Mar. 5, 2013; 10 2013 216 423.8, filed Aug. 20, 2013; and PCT/EP2014/053965, filed Feb. 28, 2014.

FIELD OF THE INVENTION

The invention relates to an electrically controllable pressure provision device for a hydraulic motor vehicle brake system and to a electrically controllable hydraulic motor vehicle brake.

BACKGROUND

"Brake-by-wire" brake systems for motor vehicles are more and more widespread in automotive technology. In addition to a brake master cylinder which can be actuated by the vehicle driver, brake systems of this type often include an electrically controllable pressure provision device, by means of which an actuation of the wheel brakes takes place in the "brake-by-wire" operating mode.

The international patent application WO 2011/029812 A1 has disclosed a "brake-by-wire" brake system having a brake master cylinder which can be actuated by brake pedal, a travel simulator and a pressure provision device. The wheel brakes are loaded with pressure by way of the pressure provision device in the "brake-by-wire" operating mode. In a fallback operating mode, the wheel brakes are loaded with pressure by means of the brake master cylinder which is actuated by brake pedal.

DE 195 13 37 B4 has disclosed an electromechanically actuable pressure modulator having a working piston which can be actuated by way of an electric motor. The working chamber is configured as a stepped bore, in which an annular piston with a pressure medium passage is guided axially movably in the region of the smaller bore step. A valve is arranged on the end face of the working piston, which valve closes the pressure medium passage within the annular piston upon actuation of the working piston. To this end, a coaxial orientation of the annular piston and the working piston is necessary. Furthermore, the pressure modulator includes a further floating piston which is arranged in parallel offset with respect to the annular piston. On account of the three pistons, the known pressure modulator is comparatively complicated to manufacture and is of comparatively large construction.

It is an object of the present invention to provide an electrically controllable pressure provision device which is suitable for a hydraulic motor vehicle brake system, which pressure provision device is improved with regard to the overall size and the manufacturing costs. Here, the pressure provision device is to be as reliable as possible with regard to leaks, in order thus to also fulfill the safety requirements for a motor vehicle for autonomous driving.

SUMMARY AND INTRODUCTORY DESCRIPTION

According to the present invention, the referenced above object is achieved by way of a pressure provision device as and a brake system as described herein.

The present invention is based on the concept that a stepped piston is guided in a stepped bore, the piston step of smaller diameter of which stepped piston dips into the step of smaller diameter of the stepped bore after a predefined actuation displacement of the stepped piston, with the result that the pressure space of the one pressure provision device is divided into a first pressure chamber and a second pressure chamber.

The pressure provision device according to the present invention includes a stepped bore which is arranged in a housing, that is to say a housing bore with a first bore region with a first bore diameter and a second bore region with a second bore diameter, the first bore diameter being smaller than the second bore diameter, and a stepped piston, that is to say a piston with a first piston region with a first piston diameter and a second piston region with a second piston diameter, the first piston diameter being smaller than the second piston diameter.

The pressure provision device represents a cylinder/piston arrangement, the piston of which can be actuated by way of an electromechanical actuator.

The electromechanical actuator for actuating the stepped piston preferably includes an electric motor and a rotational/translational gear mechanism. In order to achieve improved reliability of the pressure provision device, a sealing element is preferably provided which, in a dipped state of the piston step of smaller diameter, seals the first pressure chamber and the second pressure chamber with respect to one another. The sealing element is particularly preferably arranged between the piston step of smaller diameter and the housing in the region of the bore step of smaller diameter.

According to one preferred embodiment, the sealing element is fastened in the housing in the region of the bore step of smaller diameter, since the installation space which is necessary for this purpose can be provided more readily here.

According to another preferred embodiment, the first sealing element is fastened to the stepped piston in the region of the piston step of smaller diameter, which affords the advantage of simpler mounting on the piston. In order to achieve a division of the pressure space into two chambers as early as possible, the sealing element is particularly preferably fastened to that end of the piston step of smaller diameter which faces away from the piston step of larger diameter.

The pressure medium connector of the pressure provision device for connecting to the wheel brakes is preferably arranged in the region of the first pressure chamber.

According to one development of the invention, the second pressure chamber can preferably be connected via a hydraulic valve to a pressure medium vessel, in order for it to be possible to limit or reduce the pressure in the second pressure chamber.

According to one particularly inexpensive embodiment, the hydraulic valve is configured as a pressure limiting valve.

According to another preferred embodiment of the pressure provision device according to the invention, the hydraulic valve is configured as an electrically actuable hydraulic valve which is actuated depending on the position of the stepped piston and/or a pressure in the pressure provision device. In order for it to be possible to carry out the build-up of pressure in the pressure space in the case of a failure of the actuation of the hydraulic valve, the hydraulic valve is particularly preferably of normally closed (NC) configuration.

As an alternative, it is preferred that the hydraulic valve is configured as a mechanically actuable hydraulic valve which is actuated depending on the position of the stepped piston.

The invention also relates to a brake system having a pressure provision device according to the invention.

This is preferably a brake system for motor vehicles which can be actuated both by the vehicle driver and independently of the vehicle driver in what is known as a "brake-by-wire" operating mode, is preferably operated in the "brake-by-wire" operating mode and can be operated in at least one fallback operating mode, in which only the operation by way of the vehicle driver is possible.

The brake system preferably includes a simulation device which imparts a pleasant brake pedal feel to the vehicle driver in a "brake-by-wire" operating mode. The simulation device is particularly preferably of hydraulic configuration and is coupled in terms of action to the brake master cylinder. The simulation device is advantageously configured such that it can be switched on and off by means of a simulator release valve.

BRIEF DESCRIPTION OF THE DRAWINGS

Further preferred embodiments of the invention result from the following description using figures, in which, diagrammatically.

FURTHER DETAILED DESCRIPTION

Figure 1:
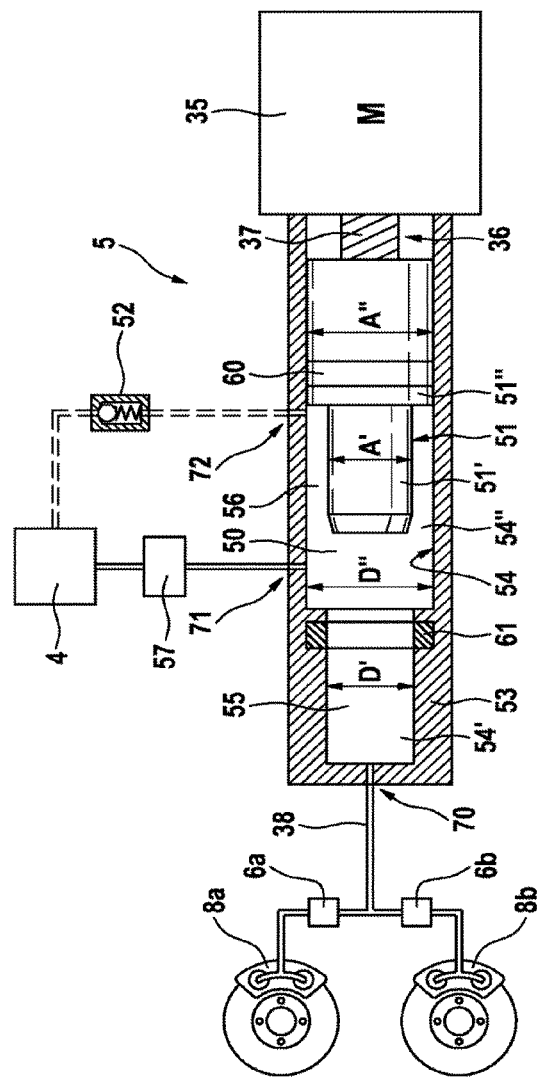
FIG. 1 shows an exemplary pressure provision device.

FIG. 1 diagrammatically shows an exemplary pressure provision device 5 for an externally actuable brake system. The pressure provision device 5 is configured as a hydraulic cylinder/piston arrangement. To this end, a stepped bore 54 is arranged in the housing 53, which stepped bore 54 forms a first bore region 54' with a first bore diameter D' and a second bore region 54" with a second bore diameter D", the first bore diameter D' being smaller than the second bore diameter D". The piston 51 is mounted displaceably in the stepped bore 54. Together with the (stepped) housing bore 54, the piston 51 delimits a pressure space 50. The piston 51 can be actuated by way of an electromechanical actuator which is formed by way of example by a diagrammatically indicated electric motor 35 and a likewise diagrammatically shown rotational/translational gear mechanism 36. The rotational/translational gear mechanism 36 is formed, for example, by a ball screw drive (BSD), of which the spindle 37 is shown in FIG. 1.

The piston 51 can therefore be actuated by way of the electric motor 35 with the rotational/translational gear mechanism 36 connected in between. As a result of the displacement of the piston 51 in the actuating direction (to the left in FIG. 1), pressure medium can be displaced out of the pressure space 50 to the wheel brakes of a hydraulic motor vehicle brake system. In FIG. 1, according to the example, two wheel brakes 8a, 8b are connected via a hydraulic connection 38 to a first connector 70 of the pressure space 50, each wheel brake being assigned an inlet valve 6a, 6b by way of example. The pressure space 50 is sealed with respect to atmospheric pressure by means of a first sealing element (main seal) 60.

The piston 51 is configured as a stepped piston, that is to say it defines a first piston region 51' formed by a pin, with a first piston diameter A' and a second piston region 51" with a second piston diameter A", the first piston diameter A' being smaller than the second piston diameter A". In other words, the piston 51 has a piston region 51' with a smaller diameter. The bore 54 and the piston 51 are configured in such a way that, upon actuation of the stepped piston 51 in the actuating direction, the piston step 51' of smaller diameter (the pin) dips into the second bore region 54' of smaller diameter of the stepped bore 54 after a predefined actuation or after a predefined actuating travel. As a result, the pressure space 50 is divided into a first pressure chamber 55 and a second pressure chamber 56, the second pressure chamber 56 being an annular chamber.

A second sealing element 61 is provided in order to seal the two pressure chambers 55, 56 with respect to one another, which second sealing element 61 is arranged between the piston step of smaller diameter first piston region 51' and the housing 53 in the region of the bore step of smaller diameter second bore region 54' in the displaced state of the first piston region 51'. Here, the sealing element 61 can be fastened in the housing 53 in the region of the bore step of smaller diameter 54' (arrangement of the second sealing element 61 in the smaller second bore region 54'), as is shown by way of example in FIG. 1. The first piston region 51' formed by the pin (the piston step of smaller diameter) then dips into the sealing element 61. As an alternative, the sealing element 61' can be fastened to the stepped piston 51 in the region of the piston step of smaller first piston diameter 51', advantageously to that end of the piston region of smaller diameter 51' which faces away from the piston step of larger diameter region 51" (arrangement of the second sealing element 61' on the pin/the piston step 51'), as is shown by way of example in FIG. 2. The first piston region 51' with the sealing element 61' then dips into the smaller second bore region 54'.

The first connector 70 of the pressure space 50 for connecting the wheel brakes 8a, 8b is arranged in the region of the first pressure chamber 55. As a result of this and as a result of the two-step configuration of the pressure provision device 5, the availability of an electrically controlled build-up of pressure at the wheel brakes 8a, 8b by means of the pressure provision device can be increased. The two-step configuration of the pressure provision device is understood to mean the stepped configuration of the housing bore 54 and the piston 51, by way of which the pressure space 50 can be divided into two pressure chambers 55, 56 which are sealed with respect to one another. In the event of a failure of the main seal 60, if a build-up of pressure is no longer possible in the (entire) pressure space 50, the piston 51 can be advanced until the second sealing element 61 comes into engagement. The pressure chamber 55 is then sealed with respect to atmospheric pressure by way of the sealing element 61, with the result that a build-up of pressure is still possible in the pressure chamber 55 and therefore in the wheel brakes 8a, 8b. A dormant fault of the sealing element 61 can be detected by way of test routines. Thus, for example at certain time intervals, preferably in the starting phase, or in other operating states, in which the vehicle is at a standstill, the hydraulic valve can be opened, the piston can be advanced as far as beyond dipping into the second sealing element, the connecting valves to the wheel brakes can be kept closed and the pressure which is produced can be evaluated by means of a pressure sensor as an indication of an intact sealing action of the second sealing element.

According to the example, a second connector 71 to the pressure space 50 is provided in the region of the second pressure chamber 56. By means of the connector 71, the pressure chamber 56 can be connected via a hydraulic valve 57 to a pressure medium vessel 4, advantageously the pressure medium reservoir 4, which is under atmospheric pressure, of the brake system. It can be brought about by means of the hydraulic valve that no further pressure rise or only a relatively small pressure rise or a pressure drop can be carried out in the pressure chamber 56, even if the piston 51 is actuated further (further build-up of pressure in the pressure chamber 55). As a result of the limiting of the pressure in the pressure chamber 56 or the pressure chamber 56 being switched to pressureless, the delivery capacity of the pressure provision device 5 to the wheel brakes (via the chamber 55) can be improved and a more rapid build-up of brake pressure can be achieved, without it being necessary for the engine performance (the engine torque) which is to be applied to be increased.

The pressure provision device 5 is improved with regard to its delivery capacity for nominal conditions (no fading), with the result that a more rapid build-up of brake pressure can take place, without it being necessary for the engine performance/engine torque which is to be installed to be raised. Nevertheless, the brake pressures which are required for brake pad fading are achieved by way of the pressure provision device. Furthermore, the overall structural length of the pressure provision device is reduced.

In the simplest case, the hydraulic valve 57 is configured as a pressure limiting valve which is connected on the rear side to the pressure medium vessel 4.

The hydraulic valve 57 can also be an electrically actuable, advantageously normally closed (NC), hydraulic valve which is opened or closed depending on the position of the stepped piston 51 and/or a pressure in the pressure provision device 5 and therefore opens or closes the connection to the pressure medium vessel 4.

As an alternative, the hydraulic valve 57 can be configured as a mechanically actuable or activatable hydraulic valve which is actuated depending on a position of the stepped piston 51 and opens or closes the connection to the pressure medium vessel 4.

The pressure space 50 is optionally connected via a third connector 72 and a hydraulic connection to a pressure medium reservoir 4, which is under atmospheric pressure, of the brake system by way of a check valve 52 which opens toward the pressure provision device 5 in the flow direction, with the result that pressure medium can be sucked out of the pressure medium reservoir 4 into the pressure space 50. According to the example, the connector 72 is arranged in the region of the second chamber 56 and is closed even in the case of a small actuation of the piston 51 by way of the piston second step 51".

According to another exemplary embodiment (not shown), a check valve 52 with respect to the brake fluid vessel, which check valve 52 closes in the direction of the vessel 4, is arranged parallel to the hydraulic valve 57, which check valve 52 makes it possible in the case of reverse movement of the piston 51 that pressure medium is sucked out of the vessel 4.

A pressure provision device according to the invention is preferably used in a brake system which is to be used for autonomous driving.

Figure 2:
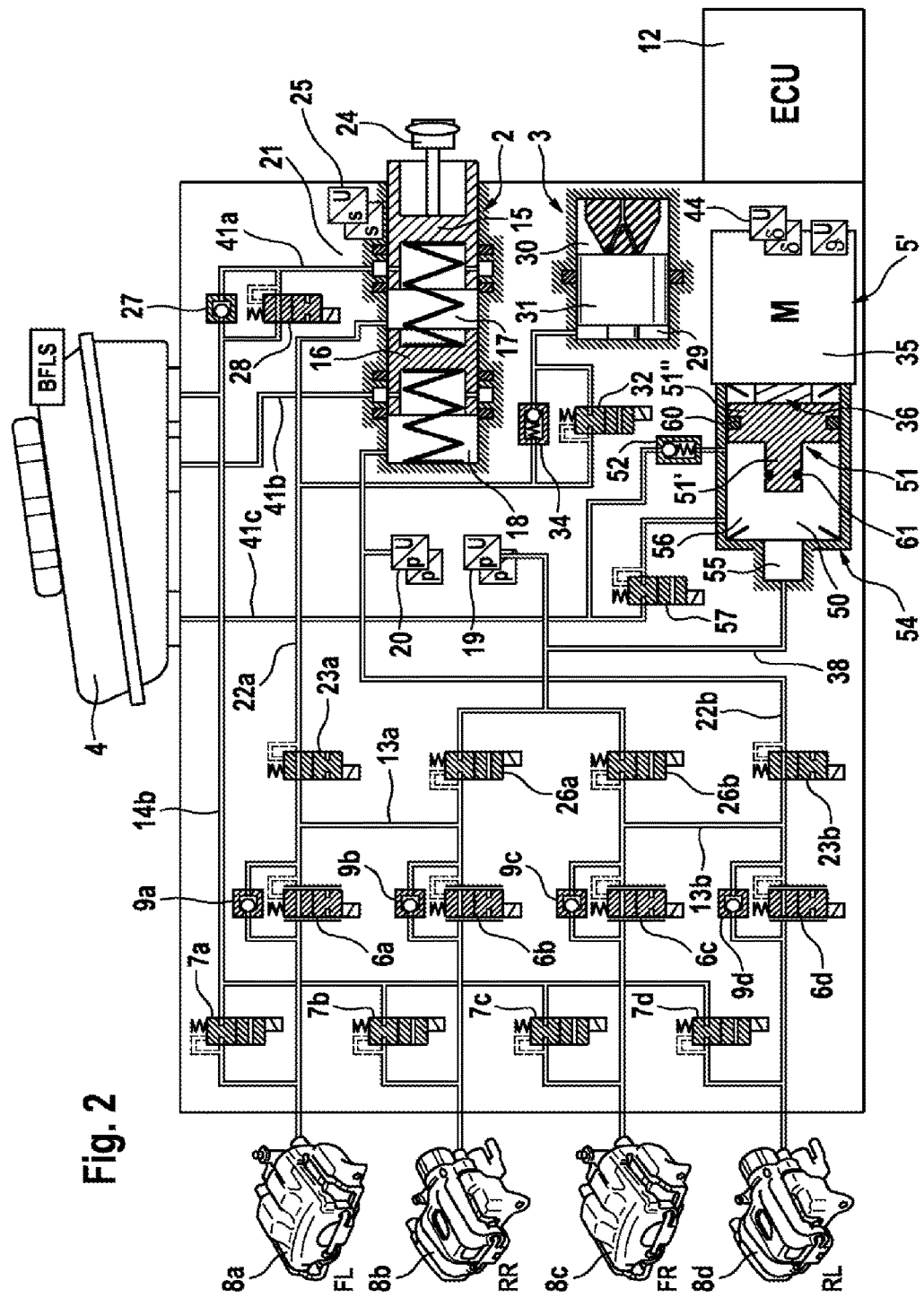
FIG. 2 shows an exemplary brake system.

FIG. 2 diagrammatically shows a brake system according to the example for motor vehicles. The brake system includes substantially a brake master cylinder which can be actuated by means of an actuating or brake pedal (not shown), a travel simulator or simulation device 3 which interacts with the brake master cylinder 2, a pressure medium reservoir 4 which is assigned to the brake master cylinder 2 and is under atmospheric pressure, an electrically controllable pressure provision device 5', an electronic control and regulating unit 12 and an electrically controllable pressure modulation device.

According to the example, per wheel brake 8a-8d of a motor vehicle (not shown), the pressure modulation device includes one inlet valve 6a-6d and one outlet valve 7a-7d which are connected hydraulically to one another in pairs via central connectors and to which wheel brakes 8a-8d are connected. The inlet connectors of the inlet valves 6a-6d are supplied by means of brake circuit supply lines 13a, 13b with pressures which are derived in a "brake-by-wire" operating mode from a brake system pressure which prevails in the system pressure line 38 which is connected to a pressure space 50 of the electrically controllable pressure provision device 5'. In each case one check valve 9a-9d which opens toward the brake circuit supply lines 13a, 13b is connected in parallel to the inlet valves 6a-6d. In a fallback operating mode, the brake circuit supply lines 13a, 13b are loaded via hydraulic lines 22a, 22b with the pressures of the pressure spaces 17, 18 of the brake master cylinder 2. The outlet connectors of the outlet valves 7a-7d are connected via a return line 14b to the pressure medium reservoir 4.

In a housing 21, the brake master cylinder 2 has two pistons 15, 16 which are arranged behind one another and delimit pressure spaces 17, 18 which form a dual-circuit brake master cylinder or a tandem master cylinder together with the pistons 15, 16. The pressure spaces 17, 18 are connected firstly via radial bores which are configured in the pistons 15, 16 and corresponding pressure equalization lines 41a, 41b to the pressure medium reservoir 4, it also being possible for said bores and lines to be shut off by way of a relative movement of the pistons 15, 16 in the housing 21, and are secondly connected by means of the hydraulic lines 22a, 22b to the abovementioned brake circuit supply lines 13a, 13b, via which the inlet valves 6a-6d are connected to the brake master cylinder 2. Here, a parallel connection of the normally open (NO) diagnosis valve 28 with a check valve 27 which closes toward the pressure medium reservoir 4 is contained in the pressure equalization line 41a. The pressure spaces 17, 18 accommodate restoring springs (not denoted in greater detail) which position the pistons 15, 16 in a starting position in the case of a non-actuated brake master cylinder 2. A piston rod 24 couples the pivoting movement of the brake pedal as a consequence of a pedal actuation to the translational movement of the first (master cylinder) piston 15, the actuation travel of which is detected by a displacement sensor 25 of preferably redundant configuration. As a result, the corresponding piston travel signal is a measure of the brake pedal actuating angle. It represents a braking request of a vehicle driver.

In each case one separating valve 23a, 23b which is configured in each case as an electrically actuable, preferably normally open (NO) valve is arranged in the line sections 22a, 22b which are connected to the pressure spaces 17, 18. The hydraulic connection between the pressure spaces 17, 18 and the brake circuit supply lines 13a, 13b can be shut off by way of the separating valves 23a, 23b. A pressure sensor 20 which is connected to the line section 22b detects the pressure which is built up in the pressure space 18 by way of a displacement of the second piston 16.

According to the exemplary embodiment, the wheel brakes 8a and 8b are assigned to the left-hand front wheel (FL) and the right-hand rear wheel (RR) and are connected to the first brake circuit I (13a). The wheel brakes 8c and 8d are assigned to the right-hand front wheel (FR) and the left-hand rear wheel (RL) and are connected to the second brake circuit II (13b).

The travel simulator 3 is coupled hydraulically to the brake master cylinder 2 and includes substantially a simulator chamber 29, a simulator spring chamber 30 and a simulator piston 31 which separates the two chambers 29, 30 from one another. The simulator piston 31 is supported on the housing 21 by way of an elastic element which is arranged in the simulator spring chamber 30. The stimulator chamber 29 can be connected by means of an electrically actuable simulator release valve 32 to the first pressure space 17 of the tandem brake master cylinder 2. If a pedal force is stipulated and the simulator release valve 32 is activated, pressure medium flows from the brake master cylinder pressure space 17 into the simulator chamber 29. A check valve 34 which is arranged hydraulically antiparallel to the simulator release valve 32 makes largely unimpeded flow of the pressure medium from the simulator 29 back to the brake master cylinder pressure space 17 possible independently of the switching state of the simulator release valve 32.

The electrically controllable pressure provision device 5' is configured as a hydraulic cylinder/piston arrangement, the piston 51 of which can be actuated by a diagrammatically indicated electric motor 35 with a rotational/translational gear mechanism 36 (likewise shown diagrammatically) being connected in between. The pressure provision device 5' is formed by a stepped bore 54 which is arranged in the housing 21 and in which the piston 51 of stepped configuration is guided displaceably. Together with the housing 21, the stepped piston 51 delimits a pressure space 50 which is sealed with respect to atmospheric pressure via a sealing element 60 which is arranged on the larger piston step 51". It is possible to suck pressure medium into the pressure space 50 by way of the piston 51 being moved back when the adding valves 26a, 26b are closed, by it being possible for pressure medium to flow out of the pressure medium reservoir 4 into the pressure space 50 via a replenishing valve 52 which is configured as a check valve which opens in the flow direction to the actuator.

Upon sufficient actuation of the piston 51, the pressure space 50 is divided into a first pressure chamber 55, in the region of which the system pressure line 38 to the wheel brakes 8a-8d is connected, and a second pressure chamber 56 (annular chamber). The chambers 55, 56 are then separated hydraulically from one another via a sealing element 61' which is arranged on the smaller piston step 51'. The connector is provided in the region of the pressure chamber 56, via which connector the pressure chamber 56 is connected to an electrically actuable, normally closed (NC) valve 57 which is connected, furthermore, via the line 41c to the pressure medium reservoir 4.

It is one advantage of the two-step pressure provision device 5' that the build-up of pressure can be carried out at the wheel brakes 8a-8d via the chamber 55 in the case of leakage in the region of the pressure chamber 56 or the sealing element 60.

There is a sensor 44 for detecting a variable which is characteristic for the position/location of the piston 51 of the pressure provision device 5', which sensor 44, according to the example, is configured as a rotor position sensor which serves to detect the rotor position of the electric motor 35. Other sensors are likewise conceivable, for example a displacement sensor for detecting the position/location of the piston 51. It is possible to determine the pressure medium volume V which is output or received by the pressure provision device 5' using the variable which is characteristic for the position/location of the piston 51. A pressure sensor 19 which is preferably of redundant configuration is provided for detecting the brake system pressure which is generated by the pressure provision device 5'.

The electronic control and regulating unit (ECU) 12 serves, for example, to actuate the pressure provision device 5', the separating valves 23a, 23b, the adding valves 26a, 26b, the simulator release valve 32, the inlet and outlet valves 6a-6d, 7a-7d, and the diagnosis valve 28.

While the above description constitutes the preferred embodiment of the present invention, it will be appreciated that the invention is susceptible to modification, variation and change without departing from the proper scope and fair meaning of the accompanying claims.

The invention claimed is:

1. An electrically controllable pressure provision device, for a hydraulic motor vehicle brake system, comprising a housing forming a stepped bore and a piston which can be actuated by an electromechanical actuator, the piston delimiting a pressure space with the housing, wherein the piston is configured as a stepped piston having a piston step of smaller diameter that dips into a step of smaller diameter of the stepped bore after a predefined actuation displacement of the stepped piston, with the result that the pressure space is divided into a first pressure chamber and a second pressure chamber.

2. The pressure provision device as claimed in claim 1, wherein the second pressure chamber communicates via a hydraulic valve to a pressure medium vessel, under atmospheric pressure.

3. The pressure provision device as claimed in claim 2, wherein the hydraulic valve is a pressure limiting valve.

4. The pressure provision device as claimed in claim 2, wherein the hydraulic valve is an electrically actuatable, normally closed, hydraulic valve which is actuated depending on a position of the stepped piston or a pressure in the pressure provision device.

5. The pressure provision device as claimed in claim 2, wherein the hydraulic valve is a mechanically actuatable hydraulic valve which is actuated depending on a position of the stepped piston.

6. The pressure provision device as claimed in claim 1, further comprising a sealing element which, in a dipped state of the piston step of smaller diameter displaced greater than the predetermined actuation displacement of the stepped piston, seals the first pressure chamber and the second pressure chamber with respect to one another.

7. The pressure provision device as claimed in claim 6, wherein the sealing element is fastened in the housing in the region of the first bore step of smaller diameter.

8. The pressure provision device as claimed in claim 6, wherein the sealing element is fastened to the stepped piston in the region of the first piston step of smaller diameter to that end of the first piston step of smaller diameter which faces away from the second piston step of larger diameter.

9. The pressure provision device as claimed in claim 1, wherein the pressure space is provided with a first pressure medium connector for connecting to hydraulically actuable wheel brakes, the first pressure medium connector being arranged in the region of the first pressure chamber.

10. A brake system for motor vehicles having a brake master cylinder which can be actuated by means of a brake pedal and at least one pressure space of the brake master cylinder is connected to wheel brakes in a manner which can be disconnected, a pressure control valve arrangement for regulating or controlling a wheel brake pressure which is triggered at a wheel brake, an electrically controllable pressure provision device which can be connected to the wheel brakes, and an electronic control and regulating unit for actuating the pressure provision device or the pressure control valve arrangement, the pressure provision device comprising a housing forming a stepped bore and a piston which can be actuated by an electromechanical actuator, the piston delimiting a pressure space with the housing, wherein the piston is configured as a stepped piston, a piston step of smaller diameter of which dips into a step of smaller diameter of the stepped bore after a predefined actuation displacement of the stepped piston, with the result that the pressure space is divided into a first pressure chamber and a second pressure chamber.

11. The brake system as claimed in claim 10, wherein the hydraulic valve is an electrically actuatable, normally closed, hydraulic valve which is actuated depending on a position of the stepped piston or a pressure in the pressure provision device.

12. The brake system as claimed in claim 10, wherein the hydraulic valve is a mechanically actuatable hydraulic valve which is actuated depending on a position of the stepped piston.

13. The brake system as claimed in one of claim 10, wherein a sealing element is provided which, in a state of the piston displaced greater than the predetermined actuation displacement of the first piston, the first step of smaller diameter seals the first pressure chamber and the second pressure chamber with respect to one another, and the sealing element is arranged between the first piston step of smaller diameter and the housing in the region of the first bore step of smaller diameter.

14. The brake system as claimed in claim 10, wherein the sealing element is fastened in the housing in the region of the first bore step of smaller diameter.

15. The brake system as claimed in claim 10, wherein the sealing element is fastened to the stepped piston in the region of the first piston step of smaller diameter to that end of the first piston step of smaller diameter which faces away from the second piston step of larger diameter.

16. The brake system as claimed in claim 10, wherein the pressure space is provided with a first pressure medium connector for connecting to hydraulically actuatable wheel brakes, the first pressure medium connector being arranged in the region of the first pressure chamber.

17. The brake system as claimed in claim 10, wherein, in a first state of the stepped piston wherein the stepped piston is displaced less than the predefined actuation displacement, the first pressure chamber and the second pressure chamber are in fluid communication, and in a second state of the stepped piston wherein the stepped piston is displaced more than the predefined actuation displacement, the first pressure chamber and the second pressure chamber are fluidically separated by the sealing element, and a first pressure medium connector for connecting to hydraulically actuatable wheel brakes, the first pressure medium connector being arranged in the region of the first pressure chamber.

18. The pressure provision device as claimed in claim 6, wherein, in a first state of the stepped piston wherein the stepped piston is displaced less than the predefined actuation displacement, the first pressure chamber and the second pressure chamber are in fluid communication, and in a second state of the stepped piston wherein the stepped piston is displaced more than the predefined actuation displacement, the first pressure chamber and the second pressure chamber are fluidically separated by the sealing element, and a first pressure medium connector for connecting to hydraulically actuatable wheel brakes, the first pressure medium connector being arranged in the region of the first pressure chamber.

19. The pressure provision device of claim 6, wherein, in the dipped state of the stepped piston displaced greater than the predetermined actuation displacement of the stepped piston, the sealing element is arranged between the piston step of smaller diameter and the housing in the region of the bore step of smaller diameter.

20. The pressure provision device of claim 1, wherein the second pressure chamber is an annular chamber.

21. The brake system of claim 10, wherein the second pressure chamber is an annular chamber.

22. The pressure provision device of claim 1, wherein, in a first state of the stepped piston wherein the stepped piston is displaced less than the predefined actuation displacement, the first pressure chamber and the second pressure chamber are in fluid communication, and in a second state of the stepped piston wherein the stepped piston is displaced more than the predefined actuation displacement, the first pressure chamber and the second pressure chamber are fluidically separated.

23. The brake system of claim 10, wherein, in a first state of the stepped piston wherein the stepped piston is displaced less than the predefined actuation displacement, the first pressure chamber and the second pressure chamber are in fluid communication, and in a second state of the stepped piston wherein the stepped piston is displaced more than the predefined actuation displacement, the first pressure chamber and the second pressure chamber are fluidically separated.

* * * * *